US008515075B1

(12) United States Patent
Saraf et al.

(10) Patent No.: US 8,515,075 B1
(45) Date of Patent: Aug. 20, 2013

(54) METHOD OF AND SYSTEM FOR MALICIOUS SOFTWARE DETECTION USING CRITICAL ADDRESS SPACE PROTECTION

(75) Inventors: Suman Saraf, Gurgaon (IN); Sharad Agrawal, Gurgaon (IN); Pankaj Kumar, Gurgaon (IN)

(73) Assignee: McAfee, Inc., Santa Clara, CA (US)

( * ) Notice: Subject to any disclaimer, the term of this patent is extended or adjusted under 35 U.S.C. 154(b) by 409 days.

(21) Appl. No.: 12/322,220

(22) Filed: Jan. 29, 2009

Related U.S. Application Data

(60) Provisional application No. 61/063,224, filed on Jan. 31, 2008.

(51) Int. Cl.
*G06F 21/00* (2006.01)

(52) U.S. Cl.
USPC .......... 380/277; 726/4; 726/24; 726/26; 713/1; 713/2; 713/150; 713/182; 713/190; 380/28

(58) Field of Classification Search
USPC .................................. 380/277, 211
See application file for complete search history.

(56) References Cited

U.S. PATENT DOCUMENTS

| | | | |
|---|---|---|---|
| 4,688,169 A | 8/1987 | Joshi | |
| 4,982,430 A | 1/1991 | Frezza et al. | |
| 5,155,847 A | 10/1992 | Kirouac et al. | |
| 5,222,134 A | 6/1993 | Waite et al. | |
| 5,390,314 A | 2/1995 | Swanson | |
| 5,521,849 A | 5/1996 | Adelson et al. | |
| 5,560,008 A | 9/1996 | Johnson et al. | |
| 5,699,513 A | 12/1997 | Feigen et al. | |
| 5,778,226 A * | 7/1998 | Adams et al. | 719/311 |
| 5,778,349 A | 7/1998 | Okonogi | |
| 5,787,427 A | 7/1998 | Benantar et al. | |
| 5,842,017 A | 11/1998 | Hookway et al. | |
| 5,907,709 A | 5/1999 | Cantey et al. | |
| 5,907,860 A * | 5/1999 | Garibay et al. | 711/117 |
| 5,926,832 A * | 7/1999 | Wing et al. | 711/141 |
| 5,974,149 A | 10/1999 | Leppek | |

(Continued)

FOREIGN PATENT DOCUMENTS

| | | |
|---|---|---|
| EP | 1 482 394 A2 | 12/2004 |
| EP | 2 037 657 A1 | 3/2009 |

(Continued)

OTHER PUBLICATIONS http://www.trust.informatik.tu-darmstadt.de/fileadmin/user_upload/Group_TRUST/LectureSlides/ESS-SS2011/rop-grayscale.pdf|Background on Buffer Overflow Attacks|Sadeghi et al.|2011.*

(Continued)

*Primary Examiner* — Mahfuzur Rahman
(74) *Attorney, Agent, or Firm* — Patent Capital Group

(57) ABSTRACT

A method of identifying malicious code based on identifying software executing out of writable memory of the computer system. In one embodiment, the identification of the malicious code occurs when the code accesses a predetermined memory address. This address can reside in the address space of an application, a library, or an operating system component. In one embodiment, the access to the predetermined address generates an exception invoking exception handling code. The exception handling code checks the memory attributes of the code that caused the exception and determines whether the code was running in writeable memory.

22 Claims, 5 Drawing Sheets

(56) References Cited

U.S. PATENT DOCUMENTS

| | | | | |
|---|---|---|---|---|
| 5,987,610 | A | 11/1999 | Franczek et al. | |
| 5,987,611 | A | 11/1999 | Freund | |
| 5,991,881 | A | 11/1999 | Conklin et al. | |
| 6,064,815 | A * | 5/2000 | Hohensee et al. | 717/138 |
| 6,073,142 | A | 6/2000 | Geiger et al. | |
| 6,141,698 | A | 10/2000 | Krishnan et al. | |
| 6,192,401 | B1 | 2/2001 | Modiri et al. | |
| 6,192,475 | B1 | 2/2001 | Wallace | |
| 6,256,773 | B1 | 7/2001 | Bowman-Amuah | |
| 6,275,938 | B1 | 8/2001 | Bond et al. | |
| 6,321,267 | B1 | 11/2001 | Donaldson | |
| 6,338,149 | B1 | 1/2002 | Ciccone, Jr. et al. | |
| 6,356,957 | B2 | 3/2002 | Sanchez, II et al. | |
| 6,393,465 | B2 | 5/2002 | Leeds | |
| 6,442,686 | B1 | 8/2002 | McArdle et al. | |
| 6,449,040 | B1 | 9/2002 | Fujita | |
| 6,453,468 | B1 | 9/2002 | D'Souza | |
| 6,460,050 | B1 | 10/2002 | Pace et al. | |
| 6,587,877 | B1 | 7/2003 | Douglis et al. | |
| 6,611,925 | B1 | 8/2003 | Spear | |
| 6,662,219 | B1 | 12/2003 | Nishanov et al. | |
| 6,748,534 | B1 | 6/2004 | Gryaznov et al. | |
| 6,769,008 | B1 | 7/2004 | Kumar et al. | |
| 6,769,115 | B1 | 7/2004 | Oldman | |
| 6,795,966 | B1 | 9/2004 | Lim et al. | |
| 6,832,227 | B2 | 12/2004 | Seki et al. | |
| 6,834,301 | B1 | 12/2004 | Hanchett | |
| 6,847,993 | B1 | 1/2005 | Novaes et al. | |
| 6,907,600 | B2 | 6/2005 | Neiger et al. | |
| 6,918,110 | B2 | 7/2005 | Hundt et al. | |
| 6,930,985 | B1 | 8/2005 | Rathi et al. | |
| 6,934,755 | B1 | 8/2005 | Saulpaugh et al. | |
| 6,988,101 | B2 | 1/2006 | Ham et al. | |
| 6,988,124 | B2 | 1/2006 | Douceur et al. | |
| 7,007,302 | B1 | 2/2006 | Jagger et al. | |
| 7,010,796 | B1 | 3/2006 | Strom et al. | |
| 7,024,548 | B1 | 4/2006 | O'Toole, Jr. | |
| 7,039,949 | B2 | 5/2006 | Cartmell et al. | |
| 7,065,767 | B2 | 6/2006 | Kambhammettu et al. | |
| 7,069,330 | B1 | 6/2006 | McArdle et al. | |
| 7,082,456 | B2 | 7/2006 | Mani-Meitav et al. | |
| 7,093,239 | B1 | 8/2006 | van der Made | |
| 7,124,409 | B2 | 10/2006 | Davis et al. | |
| 7,139,916 | B2 | 11/2006 | Billingsley et al. | |
| 7,152,148 | B2 | 12/2006 | Williams et al. | |
| 7,159,036 | B2 | 1/2007 | Hinchliffe et al. | |
| 7,177,267 | B2 | 2/2007 | Oliver et al. | |
| 7,203,864 | B2 | 4/2007 | Goin et al. | |
| 7,251,655 | B2 | 7/2007 | Kaler et al. | |
| 7,290,266 | B2 | 10/2007 | Gladstone et al. | |
| 7,302,558 | B2 | 11/2007 | Campbell et al. | |
| 7,330,849 | B2 | 2/2008 | Gerasoulis et al. | |
| 7,346,781 | B2 * | 3/2008 | Cowie et al. | 713/189 |
| 7,349,931 | B2 * | 3/2008 | Horne | 1/1 |
| 7,350,204 | B2 | 3/2008 | Lambert et al. | |
| 7,353,501 | B2 | 4/2008 | Tang et al. | |
| 7,363,022 | B2 | 4/2008 | Whelan et al. | |
| 7,370,360 | B2 | 5/2008 | van der Made | |
| 7,406,517 | B2 | 7/2008 | Hunt et al. | |
| 7,441,265 | B2 | 10/2008 | Staamann et al. | |
| 7,464,408 | B1 | 12/2008 | Shah et al. | |
| 7,506,155 | B1 | 3/2009 | Stewart et al. | |
| 7,506,170 | B2 | 3/2009 | Finnegan | |
| 7,546,333 | B2 | 6/2009 | Alon et al. | |
| 7,546,594 | B2 | 6/2009 | McGuire et al. | |
| 7,552,479 | B1 * | 6/2009 | Conover et al. | 726/24 |
| 7,607,170 | B2 | 10/2009 | Chesla | |
| 7,657,599 | B2 | 2/2010 | Smith | |
| 7,669,195 | B1 | 2/2010 | Qumei | |
| 7,685,635 | B2 | 3/2010 | Vega et al. | |
| 7,698,744 | B2 | 4/2010 | Fanton et al. | |
| 7,703,090 | B2 | 4/2010 | Napier et al. | |
| 7,757,269 | B1 | 7/2010 | Roy-Chowdhury et al. | |
| 7,765,538 | B2 | 7/2010 | Zweifel et al. | |
| 7,809,704 | B2 | 10/2010 | Surendran et al. | |
| 7,818,377 | B2 | 10/2010 | Whitney et al. | |
| 7,823,148 | B2 | 10/2010 | Deshpande et al. | |
| 7,836,504 | B2 * | 11/2010 | Ray et al. | 726/24 |
| 7,849,507 | B1 | 12/2010 | Bloch et al. | |
| 7,908,653 | B2 | 3/2011 | Brickell et al. | |
| 7,937,455 | B2 | 5/2011 | Saha et al. | |
| 7,966,659 | B1 | 6/2011 | Wilkinson et al. | |
| 8,015,563 | B2 | 9/2011 | Araujo et al. | |
| 2002/0056076 | A1 | 5/2002 | van der Made | |
| 2002/0069367 | A1 | 6/2002 | Tindal et al. | |
| 2002/0083175 | A1 | 6/2002 | Afek et al. | |
| 2002/0099671 | A1 | 7/2002 | Mastin Crosbie et al. | 705/500 |
| 2003/0014667 | A1 * | 1/2003 | Kolichtchak | 713/201 |
| 2003/0023736 | A1 | 1/2003 | Abkemeier | |
| 2003/0033510 | A1 * | 2/2003 | Dice | 712/235 |
| 2003/0073894 | A1 | 4/2003 | Chiang et al. | |
| 2003/0074552 | A1 | 4/2003 | Olkin et al. | |
| 2003/0120601 | A1 | 6/2003 | Ouye et al. | |
| 2003/0120811 | A1 | 6/2003 | Hanson et al. | |
| 2003/0120935 | A1 | 6/2003 | Teal et al. | |
| 2003/0145232 | A1 | 7/2003 | Poletto et al. | |
| 2003/0163718 | A1 | 8/2003 | Johnson et al. | |
| 2003/0167292 | A1 * | 9/2003 | Ross | 709/101 |
| 2003/0167399 | A1 | 9/2003 | Audebert et al. | |
| 2003/0200332 | A1 | 10/2003 | Gupta et al. | |
| 2003/0212902 | A1 * | 11/2003 | van der Made | 713/200 |
| 2003/0220944 | A1 | 11/2003 | Lyman Schottland et al. | |
| 2003/0221190 | A1 | 11/2003 | Deshpande et al. | |
| 2004/0003258 | A1 | 1/2004 | Billingsley et al. | |
| 2004/0015554 | A1 | 1/2004 | Wilson | 709/206 |
| 2004/0051736 | A1 | 3/2004 | Daniell | |
| 2004/0054928 | A1 | 3/2004 | Hall | |
| 2004/0143749 | A1 | 7/2004 | Tajalli et al. | |
| 2004/0167906 | A1 | 8/2004 | Smith et al. | |
| 2004/0230963 | A1 | 11/2004 | Rothman et al. | |
| 2004/0243678 | A1 | 12/2004 | Smith et al. | |
| 2004/0255161 | A1 | 12/2004 | Cavanaugh | |
| 2005/0018651 | A1 | 1/2005 | Yan et al. | |
| 2005/0086047 | A1 | 4/2005 | Uchimoto et al. | |
| 2005/0108516 | A1 * | 5/2005 | Balzer et al. | 713/150 |
| 2005/0108562 | A1 * | 5/2005 | Khazan et al. | 713/200 |
| 2005/0114672 | A1 | 5/2005 | Duncan et al. | |
| 2005/0132346 | A1 | 6/2005 | Tsantilis | |
| 2005/0228990 | A1 | 10/2005 | Kato et al. | |
| 2005/0235360 | A1 | 10/2005 | Pearson | |
| 2005/0257207 | A1 | 11/2005 | Blumfield et al. | |
| 2005/0257265 | A1 | 11/2005 | Cook et al. | |
| 2005/0260996 | A1 | 11/2005 | Groenendaal | |
| 2005/0262558 | A1 | 11/2005 | Usov | |
| 2005/0273858 | A1 | 12/2005 | Zadok et al. | |
| 2005/0283823 | A1 | 12/2005 | Okajo et al. | |
| 2005/0289538 | A1 | 12/2005 | Black-Ziegelbein et al. | |
| 2006/0004875 | A1 | 1/2006 | Baron et al. | |
| 2006/0015501 | A1 | 1/2006 | Sanamrad et al. | |
| 2006/0037016 | A1 | 2/2006 | Saha et al. | |
| 2006/0080656 | A1 | 4/2006 | Cain et al. | |
| 2006/0085785 | A1 | 4/2006 | Garrett | |
| 2006/0101277 | A1 | 5/2006 | Meenan et al. | |
| 2006/0133223 | A1 | 6/2006 | Nakamura et al. | |
| 2006/0136910 | A1 | 6/2006 | Brickell et al. | |
| 2006/0136911 | A1 | 6/2006 | Robinson et al. | |
| 2006/0195906 | A1 | 8/2006 | Jin et al. | |
| 2006/0200863 | A1 * | 9/2006 | Ray et al. | 726/24 |
| 2006/0230314 | A1 | 10/2006 | Sanjar et al. | |
| 2006/0236398 | A1 | 10/2006 | Trakic et al. | |
| 2007/0011746 | A1 | 1/2007 | Malpani et al. | |
| 2007/0028303 | A1 | 2/2007 | Brennan | |
| 2007/0039049 | A1 | 2/2007 | Kupferman et al. | |
| 2007/0050579 | A1 * | 3/2007 | Hall et al. | 711/163 |
| 2007/0050764 | A1 | 3/2007 | Traut | |
| 2007/0074199 | A1 | 3/2007 | Schoenberg | |
| 2007/0083522 | A1 | 4/2007 | Nord et al. | |
| 2007/0101435 | A1 | 5/2007 | Konanka et al. | |
| 2007/0136579 | A1 | 6/2007 | Levy et al. | |
| 2007/0143851 | A1 | 6/2007 | Nicodemus et al. | |
| 2007/0169079 | A1 | 7/2007 | Keller et al. | |
| 2007/0192329 | A1 | 8/2007 | Croft et al. | |
| 2007/0220061 | A1 | 9/2007 | Tirosh et al. | |
| 2007/0220507 | A1 | 9/2007 | Back et al. | |

| | | | |
|---|---|---|---|
| 2007/0253430 | A1 | 11/2007 | Minami et al. |
| 2007/0256138 | A1* | 11/2007 | Gadea et al. ............... 726/26 |
| 2007/0271561 | A1 | 11/2007 | Winner et al. |
| 2007/0300215 | A1 | 12/2007 | Bardsley |
| 2008/0005737 | A1* | 1/2008 | Saha et al. ............... 718/100 |
| 2008/0005798 | A1 | 1/2008 | Ross |
| 2008/0010304 | A1 | 1/2008 | Vempala et al. |
| 2008/0022384 | A1 | 1/2008 | Yee et al. |
| 2008/0034416 | A1 | 2/2008 | Kumar et al. |
| 2008/0052468 | A1* | 2/2008 | Speirs et al. ............... 711/132 |
| 2008/0082977 | A1 | 4/2008 | Araujo et al. |
| 2008/0120499 | A1 | 5/2008 | Zimmer et al. |
| 2008/0163207 | A1 | 7/2008 | Reumann et al. |
| 2008/0163210 | A1 | 7/2008 | Bowman et al. |
| 2008/0165952 | A1* | 7/2008 | Smith et al. ............... 380/28 |
| 2008/0184373 | A1 | 7/2008 | Traut et al. |
| 2008/0235534 | A1 | 9/2008 | Schunter et al. |
| 2008/0294703 | A1 | 11/2008 | Craft et al. |
| 2008/0301770 | A1 | 12/2008 | Kinder |
| 2009/0038017 | A1 | 2/2009 | Durham et al. |
| 2009/0043993 | A1* | 2/2009 | Ford et al. ............... 712/216 |
| 2009/0113110 | A1 | 4/2009 | Chen et al. |
| 2009/0144300 | A1 | 6/2009 | Chatley et al. |
| 2009/0150639 | A1 | 6/2009 | Ohata |
| 2009/0249438 | A1 | 10/2009 | Litvin et al. |
| 2010/0071035 | A1 | 3/2010 | Budko et al. |
| 2010/0100970 | A1 | 4/2010 | Chowdhury et al. |
| 2010/0114825 | A1 | 5/2010 | Siddegowda |
| 2010/0281133 | A1 | 11/2010 | Brendel |
| 2010/0293225 | A1 | 11/2010 | Sebes et al. |
| 2010/0332910 | A1 | 12/2010 | Ali et al. |
| 2011/0035423 | A1 | 2/2011 | Kobayashi et al. |
| 2011/0047543 | A1 | 2/2011 | Mohinder |
| 2011/0077948 | A1 | 3/2011 | Sharma et al. |
| 2011/0093842 | A1 | 4/2011 | Sebes |
| 2011/0093950 | A1 | 4/2011 | Bhargava et al. |
| 2011/0119760 | A1 | 5/2011 | Sebes et al. |
| 2011/0138461 | A1 | 6/2011 | Bhargava et al. |
| 2012/0278853 | A1 | 11/2012 | Chowdhury et al. |

FOREIGN PATENT DOCUMENTS

| | | |
|---|---|---|
| WO | WO 98/44404 | 10/1998 |
| WO | WO 01/84285 A2 | 11/2001 |
| WO | WO 2006/012197 A2 | 2/2006 |
| WO | WO 2006/124832 A1 | 11/2006 |
| WO | WO 2008/054997 A2 | 5/2008 |
| WO | WO 2011/059877 | 5/2011 |
| WO | WO 2012/015489 | 1/2012 |
| WO | WO 2012/015485 | 2/2012 |

OTHER PUBLICATIONS

U.S. Appl. No. 12/615,521, entitled "System and Method for Preventing Data Loss Using Virtual Machine Wrapped Applications," filed Nov. 10, 2009, Inventor(s): Sonali Agarwal, et al.
Desktop Management and Control, Website: http://www.vmware.com/solutions/desktop/, printed Oct. 12, 2009, 1 page.
Secure Mobile Computing, Website: http://www.vmware.com/solutions/desktop/mobile.html, printed Oct. 12, 2009, 2 pages.
U.S. Appl. No. 12/636,414, entitled "System and Method for Managing Virtual Machine Configurations," filed Dec. 11, 2009, Inventor(s): Harvinder Singh Sawhney, et al.
Kurt Gutzmann, "Access Control and Session Management in the HTTP Environment," Jan./Feb. 2001, pp. 26-35, IEEE Internet Computing.
U.S. Appl. No. 11/379,953, entitled "Software Modification by Group to Minimize Breakage," filed Apr. 24, 2006, Inventor(s): E. John Sebes et al.
U.S. Appl. No. 11/277,596, entitled "Execution Environment File Inventory," filed Mar. 27, 2006, Inventor(s): Rishi Bhargava et al.
U.S. Appl. No. 10/651,591, entitled "Method and System for Containment of Networked Application Client Software by Explicit Human Input," filed Aug. 29, 2003, Inventor(s): Rosen Sharma et al.
U.S. Appl. No. 10/806,578, entitled Containment of Network communication, filed Mar. 22, 2004, Inventor(s): E. John Sebes et al.
U.S. Appl. No. 10/739,230, entitled "Method and System for Containment of Usage of Language Interfaces," filed Dec. 17, 2003, Inventor(s): Rosen Sharma et al.

U.S. Appl. No. 10/935,772, entitled "Solidifying the Executable Software Set of a Computer," filed Sep. 7, 2004, Inventor(s): E. John Sebes et al.
U.S. Appl. No. 11/060,683, entitled "Distribution and Installation of Solidified Software on a Computer," Filed Feb. 16, 2005, Inventor(s): Bakul Shah et al.
U.S. Appl. No. 11/122,872, entitled "Piracy Prevention Using Unique Module Translation," filed May 4, 2005, Inventor(s): E. John Sebes et al.
U.S. Appl. No. 11/346,741, entitled "Enforcing Alignment of Approved Changes and Deployed Changes in the Software Change Life-Cycle," filed Feb. 2, 2006, Inventor(s): Rahul Roy-Chowdhury et al.
U.S. Appl. No. 11/182,320, entitled "Classification of Software on Networked Systems," filed Jul. 14, 2005, Inventor(s): E. John Sebes et al.
U.S. Appl. No. 11/400,085, entitled "Program-Based Authorization," filed Apr. 7, 2006, Inventor(s): Rishi Bhargava et al.
U.S. Appl. No. 11/437,317, entitled "Connectivity-Based Authorization," filed May 18, 2006, Inventor(s): E. John Sebes et al.
U.S. Appl. No. 12/290,380, entitled "Application Change Control," filed Oct. 29, 2008, Inventor(s): Rosen Sharma et al.
U.S. Appl. No. 12/008,274, entitled Method and Apparatus for Process Enforced Configuration Management, filed Jan. 9, 2008, Inventor(s): Rishi Bhargava et al.
U.S. Appl. No. 12/291,232, entitled "Method of and System for Computer System State Checks," filed Nov. 7, 2008, inventor(s): Rishi Bhargava et al.
U.S. Appl. No. 12/322,321, entitled "Method of and System for Computer System Denial-of-Service Protection," filed Jan. 29, 2009, Inventor(s): Suman Saraf et al.
U.S. Appl. No. 12/426,859, entitled "Method of and System for Reverse Mapping Vnode Pointers," filed Apr. 20, 2009, Inventor(s): Suman Saraf et al.
U.S. Appl. No. 12/545,609, entitled "System and Method for Enforcing Security Policies in a Virtual Environment," filed Aug. 21, 2009, Inventor(s): Amit Dang et al.
U.S. Appl. No. 12/545,745, entitled "System and Method for Providing Address Protection in a Virtual Environment," filed Aug. 21, 2009, Inventor(s): Preet Mohinder.
Eli M. Dow, et al., "The Xen Hypervisor," INFORMIT, dated Apr. 10, 2008, http://www.informit.com/articles/printerfriendly.aspx?p=1187966, printed Aug. 11, 2009 (13 pages).
"Xen Architecture Overview," Xen, dated Feb. 13, 2008, Version 1.2, http://wiki.xensource.com/xenwiki/XenArchitecture?action=AttachFile&do=get&target=Xen+architecture_Q1+2008.pdf, printed Aug. 18, 2009 (9 pages).
U.S. Appl. No. 12/551,673, entitled "Piracy Prevention Using Unique Module Translation," filed Sep. 1, 2009, Inventor(s): E. John Sebes et al.
Barrantes et al., "Randomized Instruction Set Emulation to Dispurt Binary Code Injection Attacks," Oct. 27-31, 2003, ACM, pp. 281-289.
Check Point Software Technologies Ltd.: "ZoneAlarm Security Software User Guide Version 9", Aug. 24, 2009, XP002634548, 259 pages, retrieved from Internet: URL:http://download.zonealarm.com/bin/media/pdf/zaclient91_user_manual.pdf.
Gaurav et al., "Countering Code-Injection Attacks with Instruction-Set Randomization," Oct. 27-31, 2003, ACM, pp. 272-280.
Notification of Transmittal of the International Search Report and the Written Opinion of the International Searching Authority (1 page), International Search Report (4 pages), and Written Opinion (3 pages), mailed Mar. 2, 2011, International Application No. PCT/US2010/055520.
Notification of Transmittal of the International Search Report and the Written Opinion of the International Searching Authority, or the Declaration (1 page), International Search Report (6 pages), and Written Opinion of the International Searching Authority (10 pages) for International Application No. PCT/US2011/020677 mailed Jul. 22, 2011.
Notification of Transmittal of the International Search Report and Written Opinion of the International Searching Authority, or the Declaration (1 page), International Search Report (3 pages), and Written Opinion of the International Search Authority (6 pages) for International Application No. PCT/US2011/024869 mailed Jul. 14, 2011.

Tal Garfinkel, et al., "Terra: A Virtual Machine-Based Platform for Trusted Computing," XP-002340992, SOSP'03, Oct. 19-22, 2003, 14 pages.

U.S. Appl. No. 12/844,892, entitled "System and Method for Protecting Computer Networks Against Malicious Software," filed Jul. 28, 2010, Inventor(s) Rishi Bhargava, et al.

U.S. Appl. No. 12/844,964, entitled "System and Method for Network Level Protection Against Malicious Software," filed Jul. 28, 2010, Inventor(s) Rishi Bhargava, et al.

U.S. Appl. No. 12/880,125, entitled "System and Method for Clustering Host Inventories," filed Sep. 12, 2010, Inventor(s) Rishi Bhargava, et al.

U.S. Appl. No. 12/903,993, entitled "Method and System for Containment of Usage of Language Interfaces," filed Oct. 13, 2010, Inventor(s) Rosen Sharma, et al.

U.S. Appl. No. 12/946,344, entitled "Method and System for Containment of Usage of Language Interfaces," filed Nov. 15, 2010, Inventor(s) Rosen Sharma, et al.

U.S. Appl. No. 13/012,138, entitled "System and Method for Selectively Grouping and Managing Program Files," filed Jan. 24, 2011, Inventor(s) Rishi Bhargava, et al.

U.S. Appl. No. 13/037,988, entitled "System and Method for Botnet Detection by Comprehensive Email Behavioral Analysis," filed Mar. 1, 2011, Inventor(s) Sven Krasser, et al.

IA-32 Intel® Architecture Software Developer's Manual, vol. 3B; Jun. 2006; pp. 13, 15, 22 and 145-146.

U.S. Appl. No. 13/558,181, entitled "Method and Apparatus for Process Enforced Configuration Management," filed Jul. 25, 2012, Inventor(s) Rishi Bhargava et al.

U.S. Appl. No. 13/558,227, entitled "Method and Apparatus for Process Enforced Configuration Management," filed Jul. 25, 2012, Inventor(s) Rishi Bhargava et al.

U.S. Appl. No. 13/558,277, entitled "Method and Apparatus for Process Enforced Configuration Management," filed Jul. 25, 2012, Inventor(s) Rishi Bhargava et al.

Notification of International Preliminary Report on Patentability and Written Opinion mailed May 24, 2012 for International Application No. PCT/US2010/055520, 5 pages.

Sailer et al., sHype: Secure Hypervisor Approach to Trusted Virtualized Systems, IBM research Report, Feb. 2, 2005, 13 pages.

Myung-Sup Kim et al., "A load cluster management system using SNMP and web", [Online], May 2002, pp. 367-378, [Retrieved from Internet on Oct. 24, 2012], <http://onlinelibrary.wiley.com/doi/10.1002/nem.453/pdf>.

G. Pruett et al., "BladeCenter systems management software", [Online], Nov. 2005, pp. 963-975, [Retrieved from Internet on Oct. 24, 2012], <http://citeseerx.Ist.psu.edu/viewdoc/download?doi=10.1.1.91.5091&rep=rep1&type=pdf>.

Philip M. Papadopoulos et al., "NPACI Rocks: Tools and techniques for easily deploying manageable Linux clusters" [Online], Aug. 2002, pp. 707-725, [Retrieved from internet on Oct. 24, 2012], <http://onlinelibrary.wiley.com/doi/10.1002/cpe.722/pdf>.

Thomas Staub et al., "Secure Remote Management and Software Distribution for Wireless Mesh Networks", [Online], Sep. 2007, pp. 1-8, [Retrieved from Internet on Oct. 24, 2012], <http://cds.unibe.ch/research/pub_files/B07.pdf>.

"What's New: McAfee VirusScan Enterprise, 8.8," copyright 2010, retrieved on Nov. 23, 2012 at https://kc.mcafee.com/resources/sites/MCAFEE/content/live/PRODUCT_DOCUMENTATION/22000/PD22973/en_US/VSE%208.8%20-%20What's%20New.pdf, 4 pages.

"McAfee Management for Optimized Virtual Environments," copyright 2012, retrieved on Nov. 26, 2012 at AntiVirushttp://www.mcafee.com/us/resources/data-sheets/ds-move-anti-virus.pdf, 2 pages.

Rivest, R., "The MD5 Message-Digest Algorithm", RFC 1321, Apr. 1992, retrieved on Dec. 14, 2012 from http://www.ietf.org/rfc/rfc1321.txt, 21 pages.

Hinden, R. and B. Haberman, "Unique Local IPv6 Unicast Addresses", RFC 4193, Oct. 2005, retrieved on Nov. 20, 2012 from http://tools.ietf.org/pdf/rfc4193.pdf, 17 pages.

"Secure Hash Standard (SHS)", Federal Information Processing Standards Publication, FIPS PUB 180-4, Mar. 2012, retrieved on Dec. 14, 2012 from http://csrc.nist.gov/publications/fips/fips180-4/fips-180-4.pdf, 35 pages.

U.S. Appl. No. 13/728,705, filed Dec. 27, 2012, entitled "Herd Based Scan Avoidance System in a Network Environment," Inventor(s) Venkata Ramanan, et al.

U.S. Appl. No. 13/271,102, filed Oct. 11, 2011, entitled System and Method for Critical Address Space Protection in a Hypervisor Environment, Inventors: Rajbir Bhattacharjee, et al.

International Search Report and Written Opinion mailed Dec. 14, 2012 for International Application No. 04796-1087WO, 9 pages.

U.S. Appl. No. 13/723,445, filed Dec. 21, 2012, entitled "System and Method for Enforcing Security Policies in a Virtual Environment," Inventor(s) Amit Dang, et al.

* cited by examiner

METHOD OF AND SYSTEM FOR MALICIOUS SOFTWARE DETECTION USING CRITICAL ADDRESS SPACE PROTECTION

RELATED APPLICATION

This application claims priority under 35 U.S.C. §119(e) of the co-owned U.S. Provisional Patent Application Ser. No. 61/063,224 filed Jan. 31, 2008, titled "AUTONOMIC NETWORK RESPONSE TO PROCESS HIJACKING," which is hereby incorporated by reference in its entirety.

FIELD OF THE INVENTION

The invention relates to computer software. Specifically, the invention relates to methods of and systems for detecting malicious software executing on a computer system. The invention uses attributes of memory in which the code is executing to determine whether the executing code is malicious.

BACKGROUND OF THE INVENTION

Networked servers can provide services to other networked hosts. Some of these networked hosts attempt to exploit a server by taking advantage of security loopholes. One exploitation method uses a security hole to inject malicious code into the server memory, and executes the malicious code to exploit the server. This malicious code can search the data structures of an application, a library, or an operating system component to find and utilize server system resources for the purpose of interrupting these services (such as denial of service attacks), to access sensitive information residing on the server, or to perform other malicious steps.

FIG. 1 illustrates one configuration of a malicious host 110 requesting services from a trusted host 120 providing network services. The trusted host 120 is a computer server receiving service requests 112 over a network and providing services 114 such as web, mail, and file sharing. Malicious code is injected from the malicious host 110 into the trusted host 120 using a service request. The malicious host 110 requests a service 112 in which the request encapsulates malicious code. A maliciously structured service request can exploit buffer overflow techniques resulting in the malicious code 140 being loaded into memory 150 of the trusted host 120. Traditional methods of detecting malicious software include special purpose hardware 130 such as a firewall that inspects packets within a network data stream. The packet inspection tools include processing protocols such as HTTP, in which packet payloads are for the most part plain text data. Except for image data or graphics, which can be detected and identified, a firewall will inspect a packet for unexpected binary data. When packet inspection detects unexpected binary data, an indicator of potentially executable and malicious code, the firewall 130 can isolate either the host making the service request or the stream of transmitted data. The disadvantage of this solution is that additional hardware is required. Further, blindly inspecting all packets is processing intensive. Additionally, deep packet inspection techniques require the assembly of payload data streams spread across multiple network packets and result in increased data latency.

Other malicious software identification techniques check for patterns in files and data streams against known virus signatures. The limitation of this technique is that these signatures need to be kept current and are inherently out of date when a new virus is developed.

SUMMARY OF THE INVENTION

A method of and system for detecting memory resident malicious code, based on predetermined address space protection, comprises detecting access to predetermined software addresses by software executing out of writable memory. The predetermined address spaces include memory addresses known to be referenced by malicious code. The method works for computer systems where the memory management is configurable with attributes that cause an exception or event when a configurable address or range of addresses are referenced.

In a first aspect of the present invention, a method of detecting malicious code executing in a computer system comprises identifying the code as malicious if the code is executed from writable memory. In another embodiment the code is identified as malicious when it accesses a predetermined memory address. In some embodiments, the predetermined memory address is limited to the address space of data structures describing an application, a library, or an operating system component or their associated data. In a further embodiment, the predetermined memory address is within the memory range of a process environment block, an import, an export table, a procedure linkage table, a global offset table, a program header, a library header, or a section header. In a further embodiment, the predetermined memory address is not referenced by non-malicious code after the initialization of the application, the library, or the operating system component. In response to the detection of malicious, one embodiment terminates a process, a thread, or an application associated with the code executing in writable memory.

In another embodiment, the method of identifying malicious code comprises generating an exception that invokes an exception handler when the code accesses a memory address range that include the predetermined memory address. Further, the exception handler determines if the code accesses the predetermined memory address and whether the code executes from writable memory if the code that caused the exception accessed the predetermined memory address. In a further embodiment, the exception is generated by configurable hardware for controlling memory attributes of computer system memory. The system is configured to generate an exception when an address within a memory address range, including the predetermined memory address, is accessed. The configurable hardware generates an exception when access to page or range of memory addresses is in violation of the configured attributes for the memory. The configurable attributes include specifying whether the memory is readable or writable. Further, some embodiments the detection generates an indicator of malicious code or terminates a process, a thread, or an application associated with the code causing the exception.

In a further embodiment, the exception handler resumes the code from where the exception was generated. Execution of the code is resumed by configuring the processor to execute the code and setting the configurable hardware for memory attributes for the predetermined memory address not generate another exception when the system executes the code that referenced the predetermined memory address. Next, the processor is singled stepped to execute the code that caused the exception. The hardware is reconfigured to again trigger an exception when the predetermined memory address is referenced. The code execution is continued at the instruction following the code that caused the exception.

In another embodiment, the method further comprises selecting the predetermined memory address or the address range that incorporates the predetermined memory address. The predetermined memory address is located within an address space of an application, a library, or an operating system component. In a further embodiment, the predetermined memory address is not referenced by the application, library, or operating system component after initialization.

In a second aspect of the invention, a computer processing system is configured for detecting malicious code executing in the computer processing system memory. The system comprises memory and a processing system, wherein the processing system is configured for executing an application for identifying code as malicious if it is determined that the code executed from writable memory. In one embodiment, the identification of the malicious code only occurs when the code accesses a predetermined memory address. In a further embodiment, the predetermined memory address is within an address space of data structures describing an application, a library, or an operating system component or their associated data. In a further embodiment, the predetermined memory address is within a memory range of a process environment block, and import table, an export table, a procedure linkage table, or a global offset table. Additionally, the predetermined memory address can be selected from a memory address that is not referenced by non-malicious code after the initialization of the application, the library, or the operating system component.

In another embodiment, the identification of the malicious code is performed by an exception handler invoked upon the code accessing a memory address within a range of addresses that includes the predetermined memory address, such as a memory page. Further, the system includes software, executing inside or outside the exception handler, that determines if the memory reference causing the exception was an access to the predetermined memory address. Further, the system includes software that determines whether the code executed from writable memory if the code that caused the exception by accessing the predetermined address.

In one embodiment the configurable hardware for controlling memory attributes of the computer system memory is configured to generate an exception when a memory address range, including the predetermined memory address, is accessed. The configurable hardware generates an exception when access to page or range of memory addresses is in violation of the configured attributes for the memory. The configurable attributes include specifying whether the memory is readable or writable. Further, some embodiments generate an indicator of malicious code or terminate a process, a thread, or an application associated with the code executing out of writable memory and accessing the predetermined memory address causing the exception.

In another embodiment, the execution of the code is resumed by configuring a processor associated with the computer processing system to resume code execution at an instruction that caused the exception. The predetermined memory address attribute is set to a memory attribute that will not generate another exception when the code references the predetermined memory address. The processor is then single stepped to execute the code that caused the exception. The memory attribute of the predetermined memory address is then again set to cause an exception upon reference. The execution path that was interrupted by the exception is continued by executing the next instruction following the code that referenced the predetermined memory address or in some embodiment the process, thread, or application associated with the code is terminated.

In third aspect of the present invention, a computer program embodied on a computer-readable device for malicious code detection comprises program code for identifying a code as malicious if the code executes from writable memory of the computer system. In one embodiment, the computer program identifies the code as malicious when the code accesses a predetermined memory address. In some embodiments, the predetermined memory address is within an address space of an application, a library, or an operating system component.

In one embodiment, identifying the code as malicious comprises generating an exception that invokes an exception handler when the code accesses a memory page that includes the predetermined memory address, wherein it is determined that the memory access was to the predetermined memory address, and wherein the exception handler determines that the code executes from writable memory.

DETAILED DESCRIPTION OF THE INVENTION

Figure 1:
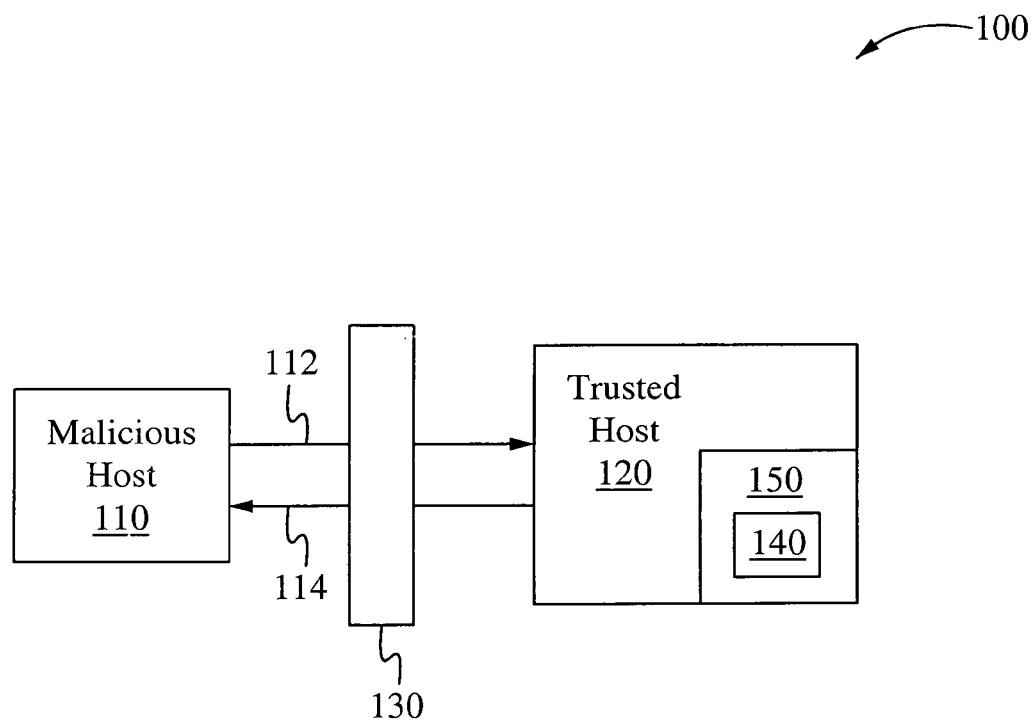
FIG. 1 illustrates a prior art configuration of a malicious host, a trusted host server, and a firewall.

The following description of the invention is provided as an enabling teaching of the invention. Those skilled in the relevant art will recognize that many changes can be made to the embodiment described, while still attaining the beneficial results of the present invention. It will also be apparent that some of the desired benefits of the present invention can be attained by selecting some of the features of the present invention without utilizing other features. Accordingly, those skilled in the art will recognize that many modifications and adaptations to the present invention are possible and can even be desirable in certain circumstances, and are a part of the present invention. Thus, the following description is provided as illustrative of the principles of the present invention and not a limitation thereof.

In accordance with the present invention, malicious code is detected when executing in writable memory of a computer system. Malicious code can infect a computer system in a number of ways. In one way, buffers used in networking are overflowed to inject malicious code. For example, web servers receiving service requests with data from untrusted hosts can be infected with malicious code embedded in the request and loaded by overflowing the web server's buffer. Data is exchanged between a host and a web server using standard network communication protocols including, but not limited to, HTTP, TCP/IP, UDP, and mail protocols. A data payload from each of these protocols can potentially be the source of malicious code. However, other means are possible for the loading of malicious code into memory. The method by which the malicious code is detected is independent of how the data is loaded or injected into memory. A predominant characteristic of malicious code loaded by buffer overflows or by other improper techniques is that the code is loaded into and executed out of memory that is writeable.

In modern computers, physical memory is managed by hardware such as an MMU (memory management unit). The MMU manages memory such that each process is prevented from altering the data or code of other processes. Further, the MMU can give a process an address space that is larger than the physical memory and appears continuous. However, this continuous data/code virtual memory can be scattered around physical memory or even swapped to disk. In one method of managing physical memory, the MMU divides memory into blocks or pages that cover a continuous range of memory addresses. MMUs give each block or page attributes that includes whether the memory is read only (text memory) or read/write (data memory) or write only.

When an application, an operating system, or a library (including a dynamically linked library) is loaded into memory, the code segments are loaded into text or read only memory. Data memory is given the attribute that includes being writable. Data memory is allocated when a program is loaded or as the program executes. Malicious code loaded or injected into data or writeable memory will execute from a writable memory space and not text memory as expected. Detection of code running in a writable memory space is an indication that the code is not under the management of the OS and thus is considered malicious or suspect code.

One method of detecting the execution of malicious code is to check the memory attribute from which every processor instruction executes. If an instruction executes out of writable memory, then it is considered, logged, or tagged as malicious or suspect code. The problem with this approach is the large processing overhead required to check the memory attribute of every executed instruction, degrading the computer system performance. An alternative approach is to leverage off a known behavior of malicious code and the behavior of properly executing code. Malicious code often needs to gain access to system functions to exploit the system. To learn the location of system resources, the malicious code will read the data structures describing operating system, application, or library code or associated data set up when a process or operating system is started or library function loaded. Example structures used by malicious code to locate system resources include, but are not limited to, PEBs (process environment blocks), import tables, export tables, procedure linkage tables, global offset tables or combinations thereof. From these data structures, a determination of library interfaces, system functions, and process addresses can be made either directly or indirectly. This information is a necessary step in further locating system resources needed to exploit the computer system, often an objective of the malicious code.

A useful characteristic of the PEBs and the other data structures mentioned above is that all or part of these data structures are infrequently referenced, usually only during the startup of an application, during a start of an operating system component, or during the initialization of a library component. By limiting the check of the memory space attribute from which the code is executing to a memory address range seldom referenced, but also being an address that is of likely interest to malicious code, the check for malicious code can be performed with minimal impact to the processing system performance and requires minimal or no overhead during normal operation.

Figure 2:
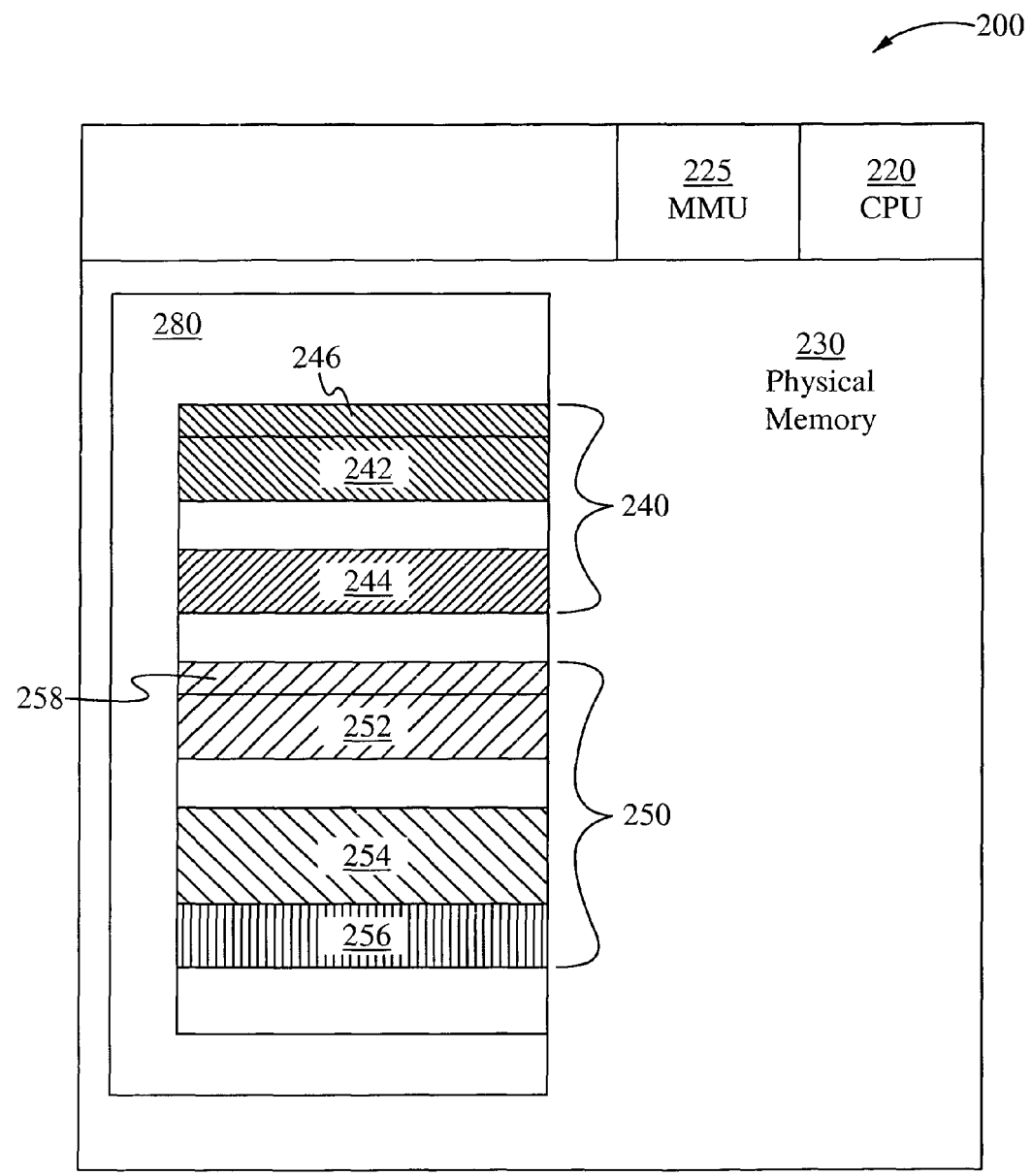
FIG. 2 illustrates a prior art organization of an application, an operating system component, and a library component loaded into system memory and configured as text and data memory.

FIG. 2 illustrates one embodiment of a computer processing system 200 utilizing an MMU 225 to manage physical memory 230. The computer processing system 200 comprises a CPU (central processing unit) 220, the MMU 225 and the physical memory 230. Loaded into the physical memory 230 are an OS component or Application 240, which comprises a block of executable code 242 and a data space 244. The executable code 242 is loaded into virtual memory 280 that maps to physical memory 230. The block of executable code 242 is loaded into text memory, a memory space where the memory manager hardware configures the memory with a read only attribute. Like many MMUs, the MMU 225 contains tables with configurable values specifying the blocks or pages of memory in physical memory and configurable attributes for each block and page. Part of the code residing in text memory is a process environment block 246. The data space 244 used by the OS component or application 240 is configured as data memory having a writable memory attribute.

Further shown loaded into physical memory 230 and residing within virtual memory 280, is a dynamically linked library (DLL) 250. The DLL 250 has a code segment 252 in text memory and associated data segments 254 in writable memory. The code for the DLL 250 includes a data structures that reference import and export tables 258 that also resides, as shown, in text memory. As shown in FIG. 2, the malicious code 256 resides in the writable memory of DLL memory 250.

Malicious code 256 is able to be injected in any number of ways, such as from malicious web service requests that overflow buffers and thus are a gateway to injecting the malicious code 256 into data memory. The malicious code detection method is independent of the method by which the code is injected into writable memory. While the malicious code is shown loaded into the library data memory space, it can also be loaded into the OS data memory, application data memory, process heap memory, thread stack memory, or any other writable memory, to name but a few examples.

Figure 3:
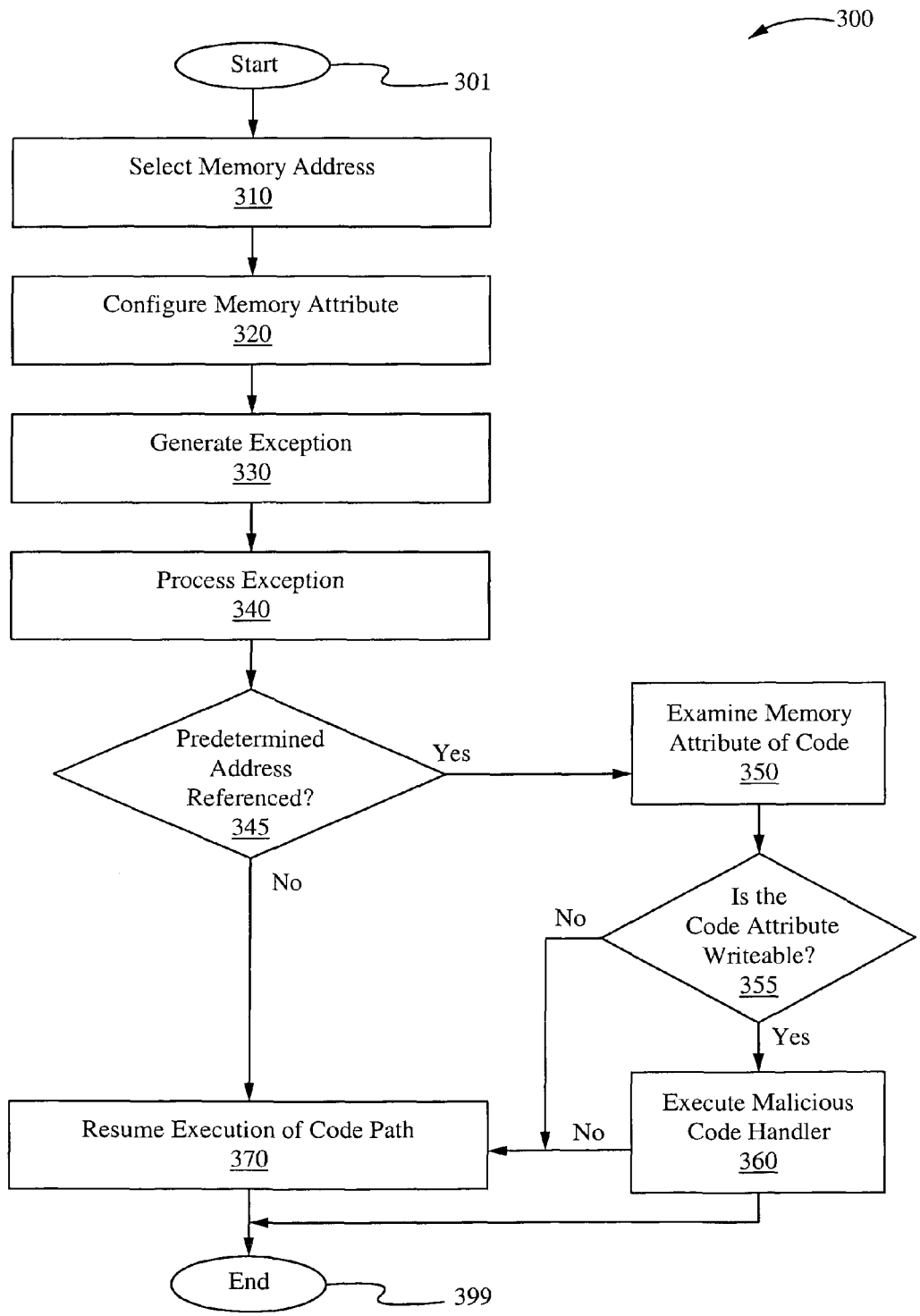
FIG. 3 illustrates steps for detecting malicious code in accordance with one embodiment of the present invention.

FIG. 3 illustrates steps 300 for detecting malicious code using predetermined address space protection 300 in accordance with one embodiment of the present invention. Code in the context of the present invention refers to processor executable instructions. The method begins at the Start step 301 which can include initialization of variables, software states, and hardware.

In the step 310, one or more predetermined memory addresses are selected. In accordance with the invention, code executing from writable memory and accessing the predetermined memory addresses is considered malicious. The predetermined addresses are one or more addresses, an address range including a memory page, or multiple address ranges, or any combination thereof. The more addresses chosen, the more likely that malicious code will be caught, but this increases the overhead needed when these addresses are referenced by non-malicious code. The predetermined addresses can be in read only memory, write only memory, or read/write memory. The predetermined addresses can be located in operating system code or data, in libraries including dynamically linked libraries, or in application programs. Further, the address can also include I/O (input/output) memory addresses, BIOS (Basic Input Output System) memory, and memory mapped devices. Preferably the predetermined memory addresses are located at an address or extend over an address range where the malicious code would reference to gain access to system resources to further exploit the system. Further, preferably the predetermined address or addresses are located in a section of memory that is either seldom referenced or is only referenced during operating system initialization, program initialization, or library initialization.

The selection of predetermined address(es), or memory pages containing a predetermined address 310 can be manually performed or selected by automated means. Operating system components are often loaded at known locations. For example, commonly used operating systems load a process environment block into a predetermined and known location. Automated means are also contemplated. A computer program can be used to automatically locate the addresses of the data structures describing operating system components, and library components including dynamic linked libraries or associated data, and determine the address range of predetermined memory sections. The predetermined sections can include a process environment block, an import table, and export table, a procedure linkage table, a global offset table, or any other memory address that is expected to be exploited by a malicious program.

In a step 320, the attribute for the predetermined memory address, page, block, program header, library header, or section header is configured to generate an exception when referenced. This step includes mapping the predetermined memory address into a memory page or block managed by the system hardware. Because the granularity of the memory management, a page or block is needs to be mapped to the predetermined memory address. Preferably, the computer system has hardware for managing memory such as an MMU (memory management unit) or other types of memory page management hardware that provide for setting memory attributes for the system memory. These attributes can be associated with a single memory address, a fixed size page of memory, or a variable sized block of memory. Preferably, the specifiable attributes include read-only memory for text memory, readable and writable memory for data memory. These attributes are configurable to generate an exception when any memory address within a page is referenced. For example, if the read attribute is configured to be excluded, then read references to this page will cause an exception.

The exceptions are handled by exception routines, which preferably are software routine. If the reference to the memory address, page, or block is in conflict the configured memory access attributes, then the reference invokes an exception routine. Some uses for memory exception or trap routines are to indicate a page fault or inaccessible memory As used by the present invention, the occurrence of an exception indicates that the memory page accessed can contain a predetermined memory address and further checking is required, including determining which memory address was referenced and the attributes of the code that made the reference.

In a step 330 an exception or trap is generated when a processor reference is made to a predetermined memory address, a memory address within a predetermined page, or a reference to an address within a predetermined block. Preferably, the exception or trap is detected and generated by hardware. The exception invokes an exception handler in response to the memory reference.

In a step 340 the exception handler is executed. The normal execution path for exception processing is to process the exception as configured by an operating system, which can include swapping the page into memory. Code is added into the exception handler and is configured into the execution path to test whether the exception was caused by a reference to a predetermined address and test whether the memory address of the code that caused the exception executes out of writeable memory.

In a step 345, it is determined if the exception was caused by a memory reference to the predetermined address or predetermined range of addresses. Because the hardware often manages memory in pages that can include memory address other than the predetermined memory address or range of memory address, the exception can be caused by a reference to a non-predetermined memory address. If the memory reference is not a predetermined memory address or range of addresses, then the execution of the code causing the exception is resumed in a step 370. If the memory reference is a predetermined memory address, then the step 350 is performed.

In a step 350, the memory address of the code that caused the memory reference exception is analyzed to determine the type of memory in which the code is located. Code considered to be non-malicious is located in memory with a read-only attribute or text memory. Code is considered to be malicious when the attribute of the memory from which the code is executing is writable. Techniques for determining the address of the code include but are not limited to examination of the instruction pointer and comparing it to the attribute mapping of virtual memory, used by the MMU, reading state information from the MMU, or examining operating system data structures.

In a step 355, the memory attribute of the code causing the exception is determined. If the memory attribute of the code is not writable, the process continues to the step 370. If the memory attribute of the code is writable, then malicious code handling is performed in a step 360.

In a step 360, a response to the detection of malicious code is executed. The malicious code handling 360 can include a range of responses. In one embodiment, the response includes setting an indicator that malicious code was detected. The information regarding the malicious code detection can include the memory location of the malicious code, which is passed to a routine outside of the exception handler. It is desirable to keep exception handling as quick as possible. Asynchronous handling of the malicious detection event is desirable when the response to detection is computationally intensive. Another response is to kill the process or thread that is executing or is suspected of executing the malicious code. Another response includes blocking access to system input/output calls, generating a set of decoy interface modules for the malicious software to try to exploit, or failing specified future system calls for a processor thread. The details of some of these techniques are found in the copending and co-owned U.S. patent application Ser. No. 10/651,588, filed Aug. 29, 2003 and entitled "DAMAGE CONTAINMENT BY TRANSLATION," which is herein incorporated by reference in its entirety; U.S. patent application Ser. No. 11/122,872, filed May 4, 2005 and entitled "PIRACY PREVENTION USING UNIQUE MODULE TRANSLATION," which is herein incorporated by reference in its entirety; and copending and co-owned U.S. patent application Ser. No. 10/935,772, filed Sep. 7, 2004 and entitled "SOLIDIFYING THE EXECUTABLE SOFTWARE SET OF A COMPUTER," which is herein incorporated by reference in its entirety. Additionally, the response to detection of malicious code includes statistical and heuristic methods to determine the identity of a host that is loading the malicious code. Identification of the malicious host allows for the blocking of the host to prevent re-infection and the potential consequences of such an infection, including a denial of services from the infected server. These statistical and heuristic techniques are disclosed in the co-owned and co-pending application having application Ser. No. 12/322,321 filed Jan. 29, 2009, entitled METHOD OF AND SYSTEM FOR COMPUTER SYSTEM DENIAL-OF-SERVICE PROTECTION," which is incorporated by reference in its entirety. If further execution processing is required, such as processing a page fault, then these further steps are performed.

In the step 370, the execution path of the code causing the exception is resumed. The method by which the execution path is resumed depends on the architecture of the processor. Described in FIG. 4 below are the details of a method of resuming the flow path in accordance with one embodiment of the present invention. The process ends in step 399.

Figure 4:
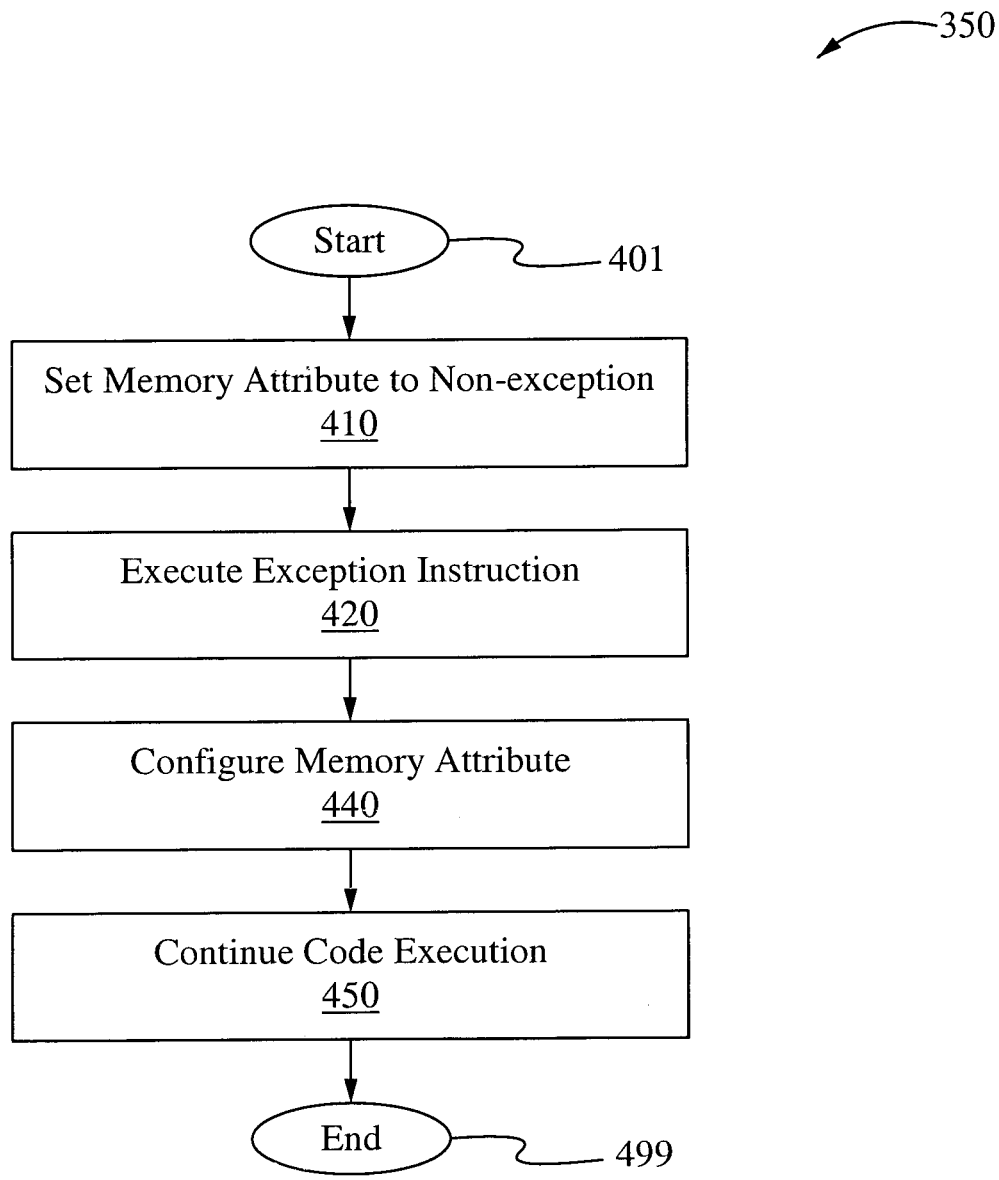
FIG. 4 illustrates one embodiment of the processing steps for continuing the code execution from the exception point in accordance with one embodiment of the present invention.

FIG. 4 illustrates one embodiment of the method steps of resuming execution of the code as described above in step 370 of FIG. 3. The method starts at step 401.

In the step 410, preferably executed within the exception handler, the attribute of the predetermined memory address is configured not to cause an exception upon referencing the predetermined memory address. This step is required because the instruction of the code that caused the exception must be retried or reexecuted. Thus, this instruction needs to be executed without causing another exception. An exemplary method by which the attribute is changed includes changing attribute bits on the memory management hardware. The purpose of changing the attribute is to prevent another exception when the processor is single stepped to execute the instruction that was stopped by the exception.

In a step 420, the processor is configured to execute in a single step the processor instruction that caused the exception by referencing the predetermined address. The method by which this is implemented depends on the architecture of the processor. As one example, the instruction pointer is set back to reference the instruction that caused the exception. Some processors support hardware for single stepping code. The single stepping process can include reading and adjusting hardware registers and reading and adjusting stack values as required for a specific processor. In the 440, the attribute of the predetermined memory address or the memory page that includes the predetermined memory address is reconfigured to cause an exception when the predetermined address is referenced. The program flow is continued by continuing the program execution path in the step 450. The process ends in the step 499.

In operation the first step for a processing system to detect memory resident malicious code is to identity one or more predetermined addresses. The predetermined addresses are identified through manual or automated techniques. The predetermined addresses are preferably contained in data structures describing applications, libraries, operating system components, or their associated data. Further, these predetermined addresses includes an address within a process environment block, an export table, an import table, a procedure linkage table, or a global offset table. Alternatively, a software program examines these components to determine the location of the predetermined addresses and mapping them to the associated memory pages. These memory addresses can be further limited to sections of the that are seldom referenced after system initialization and are of interest to malicious code. Particularly useful are the base addresses of the system components because malicious code uses the base address in conjunction with the related data structures to locate system APIs. The base address of libraries are used by malicious code to find associated import and export tables used by the malicious code in the exploitation of the system.

Next the hardware that manages the memory attributes, such as an MMU, is programmed for a memory page or pages that includes the one or more predetermined addresses to generate an exception when referenced. This attribute configuration can occur before, during, or after the loading and initialization of these components. Preferably, the configuration is preformed after the operating system initialization, library loading, and application loading but before the system reaches a state where it can be infected with malicious code.

Further, by configuring the malicious detection code after the component initialization, the overhead processing of predetermined address access detection is avoided in systems not infected with malicious code.

Preferably, the predetermined addresses selected are only accessed during the component initialization and startup, or infrequently. The computer system then operates, providing the desired services. For a web server, web pages are provided to host machines until a malicious host connects and uses techniques, including but not limited to buffer overflow to infect writable memory with malicious code. Once the malicious code starts execution, it locates the base address and using the associated data structures to find and utilize system services. Such services can include the APIs for communication socket functions to connect and provide information to an Internet connected system. If one of the predetermined addresses is a base address or a memory address of a data structure describing application, library or operating system components or associated data, then an exception will occur when the malicious code references the predetermined address. The exception will cause the invoking of exception handler code.

Because, the memory resolution of the MMU managing memory pages can cause an exception for memory reference not associated with the predetermined address, the reference causing the exception needs to be check that it is associated with a predetermined address or addresses. If the memory reference is not associated with the predetermined address or address, then the code causing the exception is resumed. If the memory access is associated with a predetermined memory address, then the exception handler checks the memory attribute of the program code that caused the exception. If the attribute indicates writable memory, then the process or thread associated with the code causing the reference is terminated or an indicator of malicious code is set or sent to another process or thread which can aggregate information and implement the appropriate response. This indicator can include the time of the execution, the address of processor code causing the exception, the process or thread identifier associated with the code causing the exception, or a combination of these. This indicator can be passed to a routine outside of the exception handler or can be handled within the exception handler. The response to the detection of malicious code can include terminating the thread or process, blocking access to I/O routines or interfaces, translating an interface the code is trying to access, or using heuristic and statistical methods to correlate the network hosts and the network addresses with the malicious code infection event.

If the thread or process executing the malicious code is not killed, then malicious code is resumed. To execute the processor instruction that caused the exception, the attribute of the predetermined memory address that caused the exception is set so that another exception is not caused. Next, the processor instruction that caused the exception is executed. In one embodiment, this function is performed by configuring the hardware to single step the processor. Next the memory attribute of the predetermined address is reconfigured to cause an exception the next time this address is referenced. Finally, the exception ends and the execution path previously interrupted by the exception is resumed.

Figure 5:
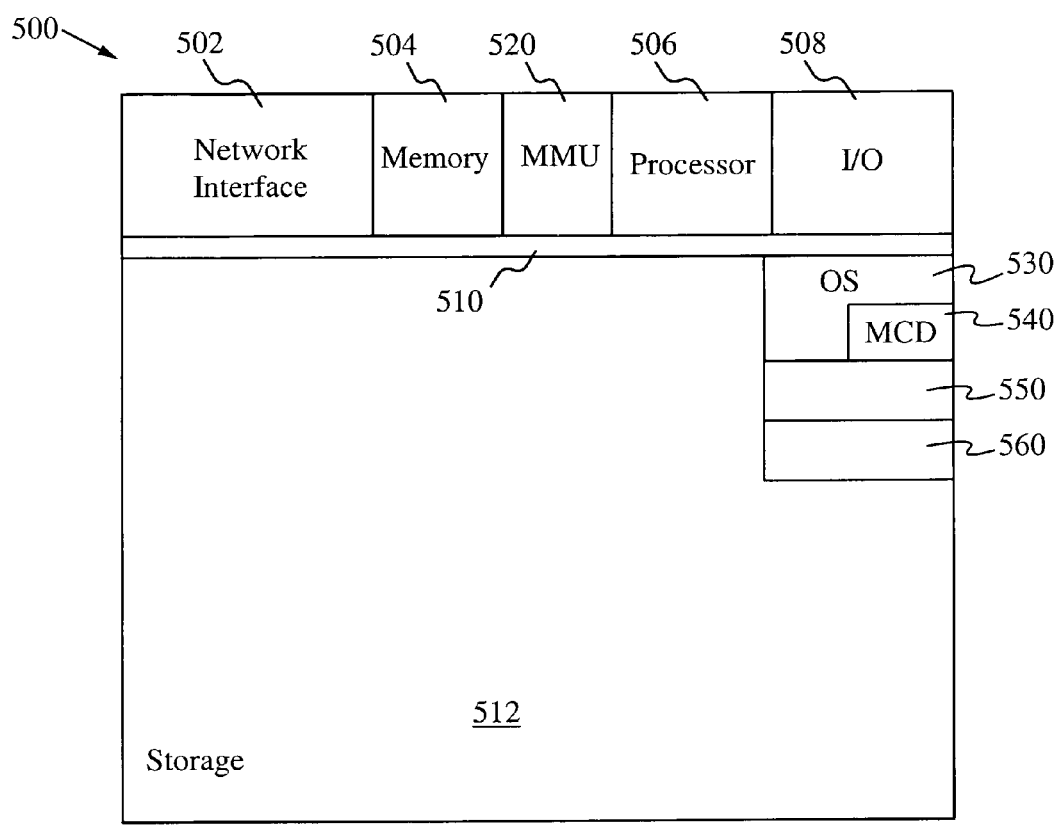
FIG. 5 illustrates a block diagram of a computing device configured to detect a memory resident malicious code in accordance with one embodiment of the present invention.

FIG. 5 illustrates a block diagram of a computing device 500 configured to implement a computer automated method of detecting malicious code operating in writable memory through predetermined address protection, in accordance to one embodiment of the present invention. The computing device 500 can be part of a system for providing network services where the computing device is in communications with untrusted hosts. The computing device 500 receives service requests including file sharing services, web server services, and e-mail services. The computing device 500 includes a storage device 512 for program and data storage. The data storage can also include web pages, files, e-mails, or combinations thereof. The storage of the malicious code detection program and data can be stored on separate devices or on the same device as the computing device 500. For example, the programming code for detection of malicious code can be stored on a tape, a local hard drive, a CD-ROM, a DVD, or solid state memory. Further, the computing device 500 can communicate with other computational systems including a human interface such as a graphical user interface. The communication can be through a network, direct communication through a dedicated communications link, or through an operating system communication channel such as a socket.

The computing device 500 includes a network interface 502, a memory 504, a memory management unit (MMU) 520, a processor 506, I/O device(s) 508, a bus 510 and a storage device 512. The processor 506 can be almost any type, so long as it has sufficient speed. The memory 504 can be any conventional computer memory known in the art. The storage device 512 can include a hard drive, tape, CDROM, CDRW, DVD, DVDRW, flash memory card or any other storage device. The computing device 500 can include one or more network interfaces 502. An example of a network interface includes a network card coupled to an Ethernet or other type of LAN. The I/O device(s) 508 can include one or more of the following: keyboard, mouse, monitor, display, printer, modem, touchscreen, button interface and other devices including remote systems. The code for the malicious code detection (MCD) 540 through predetermined address protection can be configured into the OS 530 as part of the OS exception handling routine and can be part of the OS initialization. The response handling code 550 for the detection of malicious code can be a component separate from the OS. Additionally, automated predetermined address selection and configuration code 560 is located on the storage. More or fewer components shown in FIG. 5 can be included in the computing device 500. Additional processors, either distributed or local, and additional storage can be incorporated.

Reference has been made in detail to the preferred and alternative embodiments of the invention, examples of which are illustrated in the accompanying figures. While the invention has been described in conjunction with the preferred embodiments, it will be understood that they are not intended to limit the invention. It will be readily apparent to one skilled in the art that various modification may be made to the embodiments without departing from the spirit and scope of the invention as defined by the appended claims. Furthermore, in the detailed description of the present invention, numerous specific details have been set forth in order to provide a thorough understanding of the present invention. However, it should be noted that the present invention can be practiced without these specific details. In other instances, well known methods, procedures and components have not been described in detail so as not to unnecessarily obscure aspects of the present invention.

What is claimed is:

1. A method comprising:
   identifying particular code executing on a computer system and attempting to access a particular predetermined memory address of the computer system, wherein the predetermined memory address is associated with known access attempts by malicious code;
   determining, based on identifying that the particular code attempts to access the particular predetermined memory address, that the particular code executes from writable memory space of the computer system while attempting to access the particular predetermined memory address;
   identifying the particular code as malicious based, at least in part, on determination that the particular code attempts to access the particular predetermined memory address and executes from the writable memory space of the computer system, wherein an exception is to be generated that invokes an exception handler based at least in part on identifying the particular code as malicious;
   generating an indicator to identify that the particular code was identified as malicious;
   temporarily configuring the computer system to allow single stepping of the particular code following the exception; and
   causing single stepping of the particular code.

2. The method of claim 1, wherein the particular predetermined memory address is within a memory address space of data structures describing an application, a library, or an operating system component or their associated data.

3. The method of claim 2, wherein the particular predetermined memory address is within the memory address space of a process environment block, an import table, an export table, a procedure linkage table, global offset table, program header, library header, or section header.

4. The method of claim 3, further comprising terminating execution of a process, a thread, or an application associated with the particular code that caused the exception.

5. The method of claim 1, wherein
   determining that the particular code executes from writable memory space of the computer system is in response to identifying that the particular code accesses the particular predetermined memory address.

6. The method of claim 5, wherein the computer system comprises configurable hardware adapted to control memory attributes of computer system memory and generate the exception upon access to a range of memory addresses that includes the particular predetermined memory address.

7. The method of claim 5, further comprising terminating execution of a process, a thread, or an application associated with the particular code that caused the exception.

8. The method of claim 5 further comprising resuming execution of the particular code from a location at which the exception was generated.

9. The method of claim 8, wherein temporarily configuring the computer system comprises:
   configuring a processor associated with the computer processing system to execute the particular code at an instruction that caused the exception;
   configuring an attribute of the particular predetermined memory address to a memory attribute that does not generate an exception when the processor executes the particular code that referenced the particular predetermined memory address;
   configuring the attribute of the particular predetermined memory address the particular predetermined memory address attribute to an exception attribute; and
   continuing processor execution at a next instruction following the particular code that referenced the particular predetermined memory address.

10. The method of claim 8, wherein the particular predetermined memory address is not referenced by non-malicious code after initialization of the application, the library, or the operating system component.

11. A computer processing system comprising:
  memory;
  a processing component programmed to execute; and
  an application, adapted when executed by the processing component to perform operations comprising:
    identifying particular code executing on a computer system, wherein the particular code attempts to access a particular predetermined memory address of the computer system, wherein the particular predetermined memory address is associated with known access attempts by malicious code;
    determining, based on identifying that the particular code attempts to access the particular predetermined memory address, that the particular code executes from writable memory space of the computer system while attempting to access the particular predetermined memory address; and
    identifying the particular code as malicious based, at least in part, determination that the particular code attempts to access the particular predetermined memory address and executes from the writable memory space of the computer system, wherein an exception is to be generated that invokes an exception handler based at least in part on identifying the particular code as malicious;
    generating an indicator to identify that the particular code was identified as malicious;
    temporarily configuring the computer system to allow single stepping of the particular code following the exception; and
    causing single stepping of the particular code.

12. The computer processing system of claim 11, wherein the particular predetermined memory address is within an address space of data structures describing an application, a library, or an operating system component or their associated data.

13. The computer processing system of claim 12, wherein the particular predetermined memory address is within the memory address space of a process environment block, an import table, an export table, a procedure linkage table, global offset table, program header, library header, or section header.

14. The computer processing system of claim 13, wherein the application is adapted to perform further operations comprising terminating execution of a process, a thread, or an application associated with the code that caused the exception.

15. The computer processing system of claim 11, wherein the application comprises:
  the exception handler software invoked upon access to a memory address range including the particular predetermined memory address;
  software to determine whether an attempted access was to the particular predetermined memory address;
  and software to determine that code executes from writable memory.

16. The computer processing system of claim 15, wherein the computer processing system further comprises configurable hardware for controlling memory attributes of computer system memory configurable to generate an exception upon access to a range of memory addresses that includes the particular predetermined memory address.

17. The computer processing system of claim 15, further comprising terminating execution of a process, a thread, or an application associated with the particular code that caused the exception.

18. The computer processing system of claim 15, wherein the application is further adapted to resume execution of the particular code from a location at which the exception was generated.

19. The computer processing system of claim 18, wherein temporarily configuring the computer system comprises:
  configuring a processor associated with the computer processing system to execute the particular code at an instruction that caused the exception;
  configuring an attribute of the particular predetermined memory address to a memory attribute that does not generate an exception when the processor executes the particular code that referenced the particular predetermined memory address;
  configuring the attribute of the particular predetermined memory address the particular predetermined memory address attribute to an exception attribute; and
  continuing processor execution at a next instruction following the particular code that referenced the particular predetermined memory address.

20. An article comprising a non-transitory, machine-readable storage device storing instructions operable to cause at least one processor to perform operations comprising:
  identifying particular code executing on a computer system and attempting to access a particular predetermined memory address of the computer system, wherein the predetermined memory address is associated with known access attempts by malicious code;
  determining, based on identifying that the particular code attempts to access the particular predetermined memory address, that the particular code executes from writable memory space of the computer system while attempting to access the particular predetermined memory address;
  identifying the particular code as malicious based, at least in part, on determination that the particular code attempts to access the particular predetermined memory address and executes from the writable memory space of the computer system, wherein an exception is to be generated that invokes an exception handler based at least in part on identifying the particular code as malicious;
  generating an indicator to identify that the particular code was identified as malicious;
  temporarily configuring the computer system to allow single stepping of the particular code following the exception; and
  causing single stepping of the particular code.

21. The article of claim 20, wherein the particular predetermined memory address is within an address space of data structures describing an application, a library, or an operating system component or their associated data.

22. The article of claim 20, wherein identifying the particular code as malicious comprises:
  generating an exception that invokes an exception handler when the particular code accesses the particular predetermined memory address, and wherein the exception handler determines if the particular code executes from writable memory.

* * * * *